Jan. 16, 1962  C. H. BRICKER  3,016,617
PIPE MEASURING APPLIANCE
Filed Oct. 31, 1960
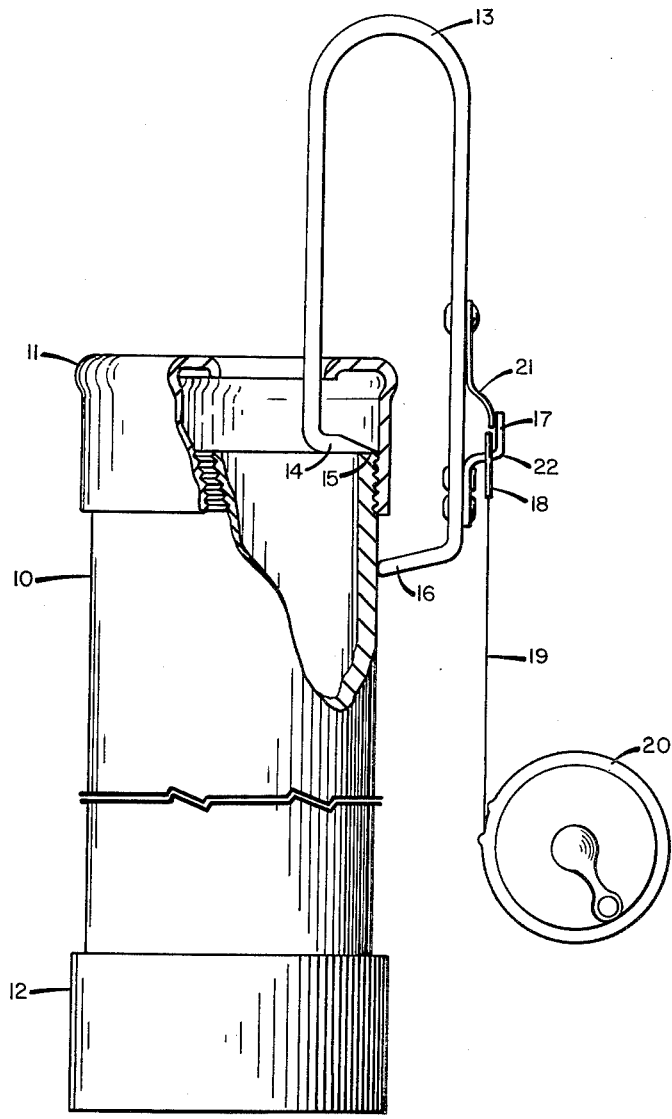
INVENTOR.
CLYDE H. BRICKER
BY *Arthur McIlroy*
ATTORNEY

3,016,617
PIPE MEASURING APPLIANCE
Clyde Henry Bricker, Ulysses, Kans., assignor to Pan American Petroleum Corporation, Tulsa, Okla., a corporation of Delaware
Filed Oct. 31, 1960, Ser. No. 66,146
2 Claims. (Cl. 33—137)

This invention relates to useful improvements in pipe measuring devices and more particularly to an appliance for measuring threaded conduits, such as, for example, oil field casing.

In completing modern oil and gas wells, it is highly desirable that an exact measurement be obtained for all casing run into the well. Normally, oil field tubular goods delivered to the well location for such completions have thread protectors at both ends of each section of pipe in order to protect the threads from damage before the pipe is used. The thread protector at the female or collar end of each joins screws into the collar leaving the extremity of the collar accessible from the outside. The thread protector at the male or pin end, however, completely covers the end of the pipe making it accessible only from the inside.

It is the present practice of most oil field operators to remove the thread protectors from the male end of the pipe while it is on the pipe rack, measure each joint from the extremity of the exposed male end to the extremity of the collar on the other end with a conventional measuring tape, and replace the thread protectors prior to picking the pipe up to be run into the well. Each joint requires careful measurement since the lengths of oil field pipe are quite random, varying by several feet.

The object of this invention is to provide a means for obtaining an accurate measurement of pipe which eliminates the time-consuming operation of removing the thread protectors prior to measuring the pipe and thereafter replacing them.

Briefly, the invention comprises a loop or U-shaped bar which straddles the thread protector. A foot on the inner leg of the loop rests on the end of the casing inside the protector. A measuring tape is attached to the outer leg of the loop such that the zero point of the tape is oriented directly opposite the end of the casing on the outside of the protector. A stabilizing foot on the end of the outer leg helps to steady the device while it is held in position at the end of the pipe.

The accompanying drawing shows an elevational view, partly in section, of an application of one embodiment of the invention. In the drawing, numeral 10 represents a joint of casing threaded at both ends having a thread protector 11 on one end and a casing collar 12 at the other end. The thread protector 11 is of the type which extends beyond and curves over the casing threads so as to protect the end of the casing as well as the threads themselves. The loop 13 of the measuring device has an index foot 14 on its inner leg which is manually positioned on the end 15 of the casing 10. Stabilizer 16 on the outer leg of the loop 13 rests against the outer surface of the casing 10 thereby orienting the axis of index foot 14 at right angles to the longitudinal axis of the casing. A tape retainer hook 17 is riveted or otherwise attached to the outer leg of loop 13 to receive a ring 18 affixed to a measuring tape 19 which is housed within a conventional tape reel 20. A leaf spring 21, may be riveted or otherwise attached to the outer leg of loop 13 to press against the inside surface at the tip of hook 17 to prevent the accidental unhooking of ring 18. The tape retainer hook 17 is oriented in relation to the outer leg of loop 13 such that when the measuring appliance is in place on the casing, the zero index of the measuring tape 19 is at point 22 which lies in a plane perpendicular to the axis of the casing and passing between the lower face of the index foot 14 and the end 15 of casing 10.

In using the appliance, index foot 14 is inserted in the space between the end of the casing and the thread protector end and is held firmly against the end 15 of casing 10.

In using the appliance, index foot 14 is inserted in the space between the end of the casing and the thread protector end and is held firmly against the end 15 of casing 10, while at the same time the stabilizer foot 16 is held firmly against the outer surface of the casing. The measurement is then made by reading the tape opposite the end of the collar at the other end of the casing.

For ease of manufacture, the loop, index foot, and stabilizer foot could be integral. The tape retainer hook could be affixed to the outer leg of the loop in such a manner that it could be slidably adjusted to accommodate various measuring tapes having a different zero index in relation to the end of the tape.

The appliance is preferably made from steel or aluminum, but it could be made from any other suitable material such as plastic.

I do not desire to be limited to the specific construction illustrated in the drawing since the appliance could take numerous forms without departing in principle from the intended scope of the invention.

I claim:
1. An attachment for a tape measure comprising a loop-shaped member, an extension substantially at right angles to a first leg of said member and extending toward the other leg of said member, a reference measuring point on said other leg positioned opposite said extension, and means for securing the end of said tape measure at said reference measuring point on said other leg.

2. A device for use in measuring the length of a conduit having an externally threaded end with a protector thereon, said protector extending beyond said threaded end, which comprises a loop-shaped member, an extension substantially at right angles to a first leg of said member and extending toward the other leg of said member, a reference measuring point on said other leg positioned opposite said extension, means for securing the end of said tape measure at said reference measuring point on said other leg, and a stabilizing foot at the end of said other leg below said extension directed inwardly toward and adapted to rest on the outer wall of said conduit while said member is being used.

No references cited.